United States Patent
Connett et al.

[15] 3,646,959
[45] Mar. 7, 1972

[54] POWER TRANSMISSION

[72] Inventors: Donald C. Connett, Huntington; Gerald N. Olsen, Torrance, both of Calif.; Kurt R. Lonnemo, Troy, Mich.

[73] Assignee: Sperry Rand Corporation, Troy, Mich.

[22] Filed: Oct. 12, 1970

[21] Appl. No.: 79,782

[52] U.S. Cl..................................137/596.12, 137/636
[51] Int. Cl..........................................F16k 11/10
[58] Field of Search..............137/569.12, 569.15, 569.18, 137/569.2, 636

[56] References Cited

UNITED STATES PATENTS 2,417,278    3/1947    Van Der Werff..................137/636 X
3,306,367    2/1967    Raeber et al..................137/596.12 X Primary Examiner—Henry T. Klinksiek
Attorney—Van Meter and George

[57] ABSTRACT

A pressure-modulating directional control valve for high-inertia loads such as the swing drive of a crane uses two three-way spool valves biased to inlet-open position and a separate pressure-regulating valve with a minimum spring bias and a manually variable hydraulic bias. Each three-way valve has a variable pilot pressure relief valve and these are alternately operable by a manual lever to modulate pilot biasing pressure applied to the pressure-regulating valve and also to one or the other of the three-way valves whenever it is acting as a brake valve in the return side of the circuit during motor overrun.

6 Claims, 1 Drawing Figure

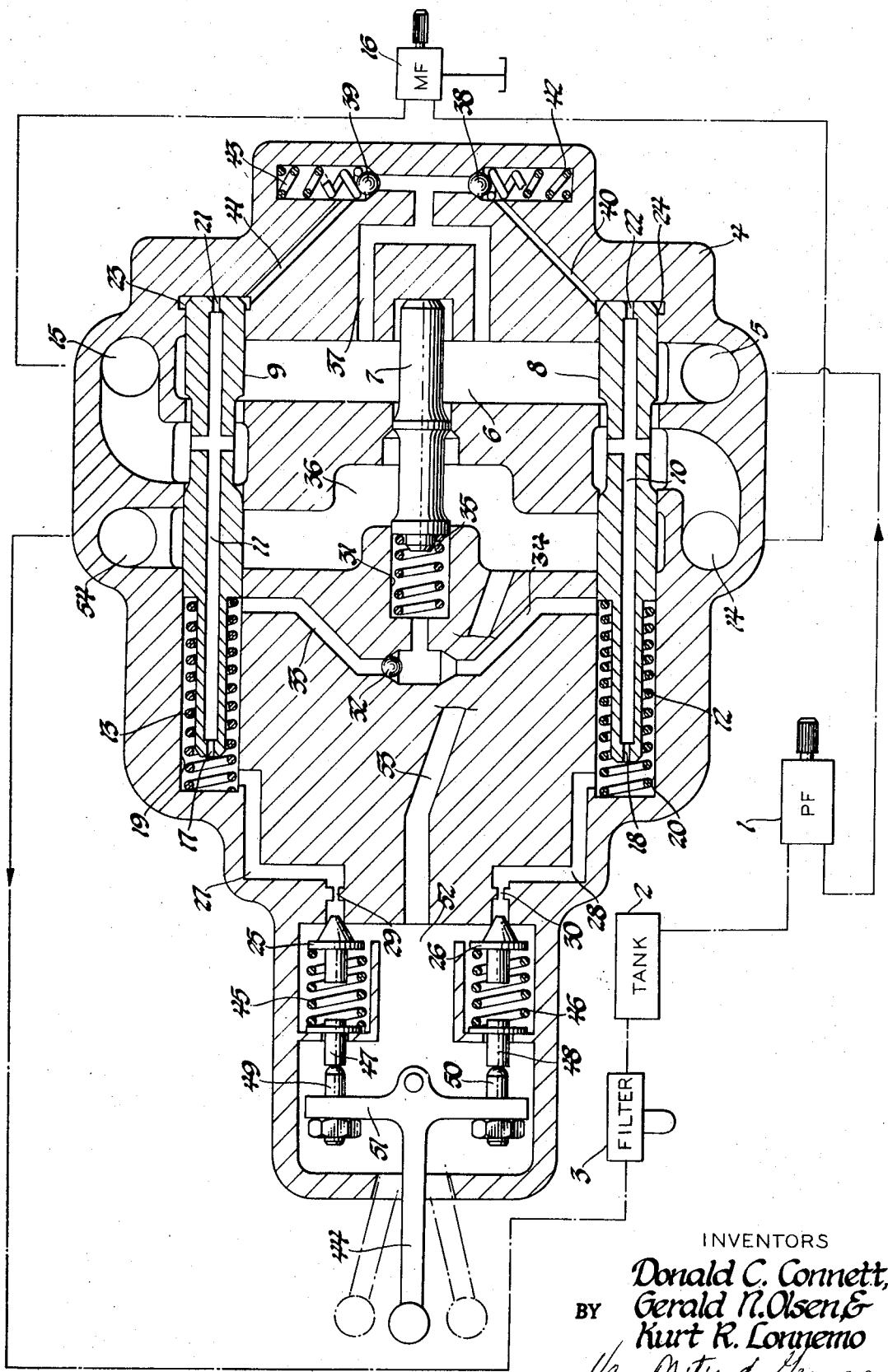

POWER TRANSMISSION

Hydraulic power systems which are used to drive high-inertia loads under manual control, such for example as cranes, power shovels, etc., have heretofore been designed with manually operated directional valves by which the operator directly determines the degree and direction of opening or closure of the valve. This requires a high degree of skill and experience to produce smooth operation of the load. Too sudden closure when the load is moving at its higher velocities can result in excessive pressures because of the large inertia of the load and this causes jerky operation and imposes severe strains upon the mechanical and the hydraulic mechanisms. Previous efforts to provide a control system through which the operator may impose modulated pressures or torque upon the load have encountered similar difficulties.

It is an object of the present invention to provide a pressure-modulating directional control valve in which these difficulties are overcome and whereby an operator may apply a pressure or torque of any desired degree to the load for acceleration and to maintain any desired driving torque thereafter, and which will permit coasting of the load or will apply a variable braking pressure to the load when it overruns by its own inertia, and to accomplish these modes of operation by a single hand lever swingable in a natural manner to either side of a neutral position.

The invention consists in a pressure-modulating directional control valve which comprises first and second three-way valves, each controlling flow between a work port and an inlet and an outlet, a spring biasing each three-way valve to connect its work port with the inlet, a pressure relief valve between the inlet and the outlet biased to maintain a low minimum pressure at the inlet, hydraulic means for imposing higher biasing forces on the relief valve, passages connecting the inlet through individual check valves with each three-way valve to apply inlet pressure to move the valve in opposition to its bias, and alternately operable means are provided for manually increasing the pressure bias on the relief valve and for blocking flow through one of the check valves to maintain the first three-way valve in a position open for inlet flow whereby the second three-way valve will be shifted by flow through its check valve to a position open for outlet flow and the pressure level at the inlet will be regulated by the relief valve. IN THE DRAWING:

The single FIG. is a diagrammatic view of a control valve and its connections to a hydraulic power system incorporating a preferred form of the present invention.

A power-driven fixed displacement pump 1 receives fluid from a tank 2. A filter 3 is located in the system return line to the tank. The pump outlet is connected to the pressure-modulating directional valve 4 of the present invention at its inlet port 5. Within the valve 4 the pump delivery pressure is connected through internal passage 6 to a multiplicity of valves. Thus, the passage 6 is connected with a pressure control or relief valve 7 and with a pair of three-way directional control valve spools 8 and 9. The inlet passage 6 is also connected to chambers 23 and 24 at the right end of the valves 9 and 8 respectively. This connection is established through a passage 37 and through individual check valves 38 and 39 and passages 40 and 41. The check valves are normally closed by springs 42 and 43 to allow flow from the inlet passage 6 to the end chambers 23 and 24 or to block the reverse flow.

The three-way valves 8 and 9 have internal passages 10 and 11 which, in the position illustrated in the drawing, connect with the work ports 14 and 15 as well as with the inlet passage 6. Springs 12 and 13 normally bias the valves 8 and 9 to their right-hand position illustrated. The work ports 14 and 15 are connected to the fixed displacement fluid motor 16 which may drive a high-inertia load. When either of the three-way valves 8 or 9 is shifted to the left, it transfers the connection of its respective work port 14 or 15 to the return passage 36 and its external port 54 which is connected through filter 3 to the tank 2. The internal passages 10 and 11 in the valve spools have restrictions 18 and 17 respectively at the left-hand ends and restrictions 22 and 21 respectively at their right-hand ends.

The spring chambers 19 and 20 communicate with poppet valves 25 and 26 through passages 27 and 28 and restrictions 29 and 30. When the valves 8 and 9 are in the position illustrated, the spring chambers 20 and 19 are also connected to the spring chamber 31 of the relief valve 7 through passages 33 and 34, but these passages are closed by either valve whenever it shifts to the left and begins to open its work port to the return chamber 36.

The relief valve 7 is biased by a spring 35 which is sufficiently strong to maintain only a low minimum operating pressure in the inlet passage 6. This flow at neutral takes substantially the entire delivery of the pump 1 from inlet 5 and passage 6 through valve 7 to passage 36 and outlet 54 whence it returns to filter 3 to the tank 2. A small flow takes place through poppet 25 or 26 and maintains a small hydraulic bias to supplement the spring bias on relief valve 7.

Alternately operable means is provided for hydraulically increasing the bias on the relief valve 7 and for allowing one or the other of the three-way valves 8 and 9 to shift from the illustrated position, where the work port is open to inlet, to the alternate position where the work port is open to outlet. This includes the poppets 25 and 26 acting as pilot relief valves having springs 45 and 46 which bias the valves to maintain a very low pressure at their respective inlets. Push rods 47 and 48 are abutted by adjustable tappets 49 and 50 mounted on crossarm 51 which may be swung to either side of the neutral position by operation of the hand lever 44. The two pilot relief valves 25 and 26 exhaust into the pilot housing chamber 52 which connects with the return passage 36 via a connection 53.

In operation, the pressure-modulating directional valve functions in several modes, including neutral, modulated acceleration (left or right), modulated constant torque (left or right), coast (left or right), and modulated braking (left or right). At neutral, the hand lever 44 is centered and the three-way valves 8 and 9 are held in the rightward position illustrated by their bias springs 12 and 13. Both work ports 14 and 15 to the motor 16 are open to pump delivery pressure in the passage 6 so that there is no pressure differential across the motor 16 to cause motion. Most of the pump flow passes through the relief valve 7 which maintains a low minimum value of pressure in the passage 6 as determined by the force of the spring 35 aided by the hydraulic force exerted in chamber 31 imposed by the preloading of the springs 45 and 46 on the pilot relief valves 25 and 26 and supplemented by the small pressure drop through orifices 17 and 18, 29 and 30.

When it is desired to accelerate the load connected to the motor 16, the manual lever 44 may be swung off center in the appropriate direction. Assuming it to be clockwise, the pilot relief valve spring 45 is compressed, loading the valve and further restricting the pilot flow from chamber 6 through the internal passage 11 in the three-way valve 9. The pressure rises in the spring chamber 19 and in passage 33 to the shuttle valve 32 which immediately shifts to close the passage 34 and at the same time reacts in the spring chamber 31 to increase the bias on the relief valve 7. The inlet pressure in chamber 6 accordingly rises to a new value and is transmitted through the passage 37 and check valve 38 to the right end of the three-way valve 8. Since this rise in pressure is shut off from the spring chamber 20 by the shuttle valve 32, and since the restrictor 22 prevents a free flow from chamber 24 through the passage 10, three-way valve spool 8 will shift to the left, transferring the work port 14 from its connection with inlet 6 to a connection with outlet 36 and, incidentally closing off the spring chamber 20 from the passage 34. Three-way valve 9 on the other hand, remains in its rightward position because of the bias of spring 13 and the increased pressure maintained in spring chamber 19 by the pilot relief valve 25 which is transmitted to the end chamber 23 through passage 11, incidentally blocking flow through check valve 39. In this mode of operation, the operator may modulate the pressure applied in the inlet passage 6 to the motor 16 and thus produce any desired torque on the inertia load to which the motor 16 is connected. As the motor turns, the return flow is conducted through port 14, valve 8, passage 36 and port 54 to the tank.

As soon as sufficient torque has been applied to the motor 16 to accelerate the load to a desired speed, this speed may be maintained by the operator by shifting the hand lever 44 back a small distance toward neutral so as to maintain the proper value of torque to drive the load at the desired speed. Likewise, if the load conditions are such that it is continuously biased in a direction opposite to the accelerating motion, as for example when a crane is on a side hill location or there are heavy wind loads upon it, the load may be maintained stationary against these biasing forces by appropriately adjusting the hand lever 44 to produce the required torque at the motor 16.

If, after the motor has been brought up to speed, the operator wishes to allow the load to coast, he then restores the hand lever 44 to its neutral position in which the flow conditions are as previously described and both sides of the motor are in communication through port 14, valve 8, passage 6, valve 9 and port 15. During the changeover from motoring operation to coasting operation, the valve 8 moves toward its right-hand position and is retarded because of the fluid trapped in the chamber 24 by the check valve 38 which can only escape through the orifice 22. This produces a transitory braking effect while the valve 8 throttles return flow from port 14 to the return passage 36, the pressure in port 14 being regulated by the biasing force of the spring 12.

If, under conditions when the inertia of the load is driving the motor as a pump, that is when the motor is overrunning, it should be desired to apply a braking force to the load, this may be done by shifting the hand lever 44 away from neutral in the opposite direction, that is to say, counterclockwise. This compresses the spring 46 of the pilot valve 26, thus raising the pressure in the passage 28 which is receiving inlet fluid through the check valve 38 and the internal passage 10 of the valve 8. It will be noted at this time that the three-way valve 8 is shifted to the left and closes off the passage 34. Thus, there can be no flow to the shuttle valve 32 and the biasing chamber 31 of the valve 7. As a consequence, the motor 16 acting as a pump must build up pressure in the port 14 sufficiently high to overcome not only the bias force of the spring 12, but also the biasing force of the higher pressure fluid in spring chamber 20. These pressures are considerably higher at the moment than the pressure in the inlet chamber 6 and thus the orifice 18 creates a pressure drop between port 14 and spring chamber 20, causing the three-way valve 8 to temporarily act as a pilot-operated relief valve governed by the pilot relief valve 26. This applies the desired back pressure upon the outlet of motor 16 and thus brakes the inertia load.

In using the valve of the present invention, the control exercised by the operator through hand lever 44 is inherently an instinctive one. Pushing the lever in one direction produces a torque on the load which is substantially proportional to the distance through which the lever is pushed. Restoring the lever to neutral eliminates the torque and pushing the lever in the opposite direction applies a countertorque, again, substantially proportional to the distance through which the lever is pushed. Any external torque which may be applied to the motor by reason of the inertia of the load or by other external forces may be overcome by the operator through the same instinctive movements of the hand lever 44.

We claim:

1. A pressure-modulating directional control valve comprising first and second three-way valves, each controlling flow between a work port and an inlet and an outlet, a spring biasing each three-way valve to connect its work port with the inlet, a pressure relief valve between the inlet and outlet biased to maintain a low minimum pressure at the inlet, hydraulic means for imposing higher biasing forces on the relief valve, passages connecting the inlet through individual check valves with each three-way valve to apply inlet pressure to move the valve in opposition to its bias, and alternately operable means for manually increasing the pressure bias on the relief valve and for blocking flow through one of the check valves to maintain the first three-way valve in a position open for inlet flow whereby the second three-way valve will be shifted by flow through its check valve to a position open for outlet flow and the pressure level at the inlet will be regulated by the relief valve.

2. A valve as defined in claim 1 wherein the alternately operable means includes a shuttle valve responsive to pressure applied to bias the relief valve for blocking escape through the inactive one of the alternately operable means.

3. A valve as defined in claim 2 wherein the alternately operable means each includes a connection with the inlet which extends through one of the three-way valves and its check valve.

4. A valve as defined in claim 3 wherein the connection has a branch which opens to the motor port for that valve.

5. A valve as defined in claim 4 which includes means on each three-way valve for rendering the valve responsive to pressure at the motor port when that pressure is higher than the inlet pressure due to motor overrun.

6. A valve as defined in claim 1 wherein the alternately operable means includes a pair of spring-biased pilot relief valves and a swingable handle connected to variably compress one or the other of the relief valve springs by movement in one direction or the other from a neutral position.

* * * * *